W. L. OFFICER.
MEANS FOR CONNECTING FLEXIBLE ELEMENTS TO DRUMS.
APPLICATION FILED MAY 25, 1920.
1,388,662. Patented Aug. 23, 1921.
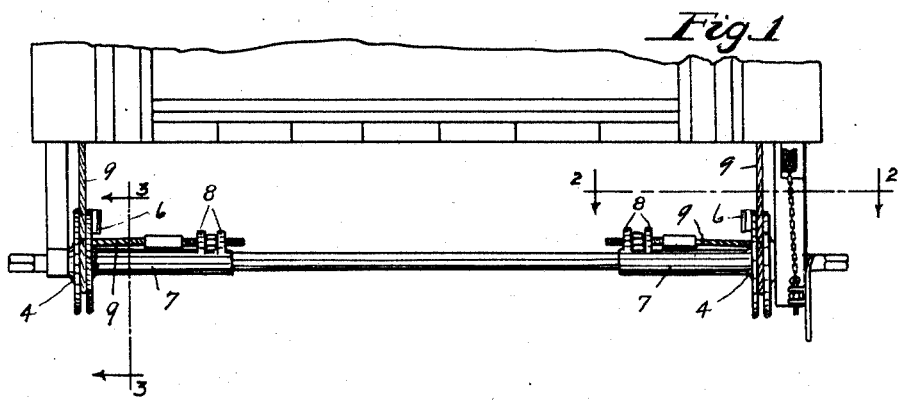
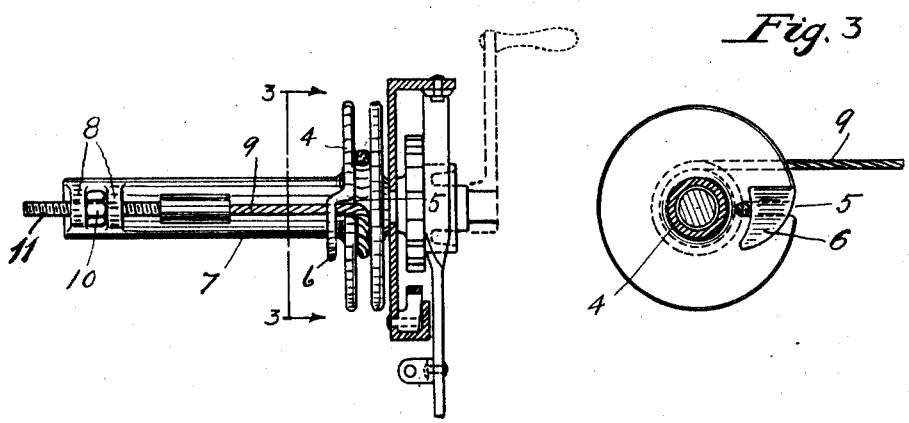
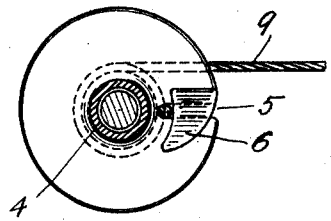
Inventor
W. L. Officer.

UNITED STATES PATENT OFFICE.

WYMAN L. OFFICER, OF WARREN, MINNESOTA.

MEANS FOR CONNECTING FLEXIBLE ELEMENTS TO DRUMS.

1,388,662.  Specification of Letters Patent.  Patented Aug. 23, 1921.

Application filed May 25, 1920. Serial No. 384,215.

*To all whom it may concern:*

Be it known that I, WYMAN L. OFFICER, a citizen of the United States, and a resident of Warren, in the county of Marshall and State of Minnesota, have invented certain new and useful Improvements in Means for Connecting Flexible Elements to Drums, of which the following is a specification.

This invention relates to improvements in drums.

The principal object of the invention is to provide a ready and easy means for attaching a flexible element to a drum for lifting a car door, as well as adjusting its effective length.

With these and other objects in view which will become apparent as the description proceeds, the invention resides in the construction, combination and arrangement of parts hereinafter more fully described and claimed, and illustrated in the accompanying drawing, in which like characters of reference indicate like parts throughout the several figures, of which:

Figure 1 is a side elevation of a pair of drums incorporating improvements constructed according to my invention;

Fig. 2 is an enlarged detail view of one of the drums taken on the plane indicated by the line of 2—2 of Fig. 1, looking in the direction of the arrows, and Fig. 3 is a detail view of one of the drum flanges taken on the plane indicated by the line of 3—3 of Figs. 1 and 2, looking in the direction of the arrows.

Referring more in detail to the drawing, the drums are indicated generally at 4 attached to a shaft journaled for rotation in plates secured to the underframe of a railway car. One of the flanges of the drum is provided with a slot 5 and an angular guard 6, the former for extending a flexible element through it and the latter for holding it in place; also a projecting hub 7, having spaced lugs 8 with apertures for receiving a threaded bolt 11 attached to the end of the flexible element 9, and held in adjusted position by a nut 10 threaded on the bolt and received between the lugs 8.

I claim:—

In a device of the class described, the combination of a shaft journaled in plates for rotation, flanged winding drums carried by the shaft, a slot formed in one of the flanges of each drum for extending a flexible element through it, an angular guard provided on said flange and extending across the slot for holding the flexible element in place, spaced lugs provided on each drum hub with eyes in them, a threaded bolt secured to the flexible element and passed through the said eyes, and a nut threaded on the bolt between the spaced lugs, whereby the flexible element is adjustably secured.

WYMAN L. OFFICER.